I. E. JACKSON.
PERMUTATION TIRE LOCK.
APPLICATION FILED FEB. 7, 1917.
1,240,146.
Patented Sept. 11, 1917.
2 SHEETS—SHEET 1.
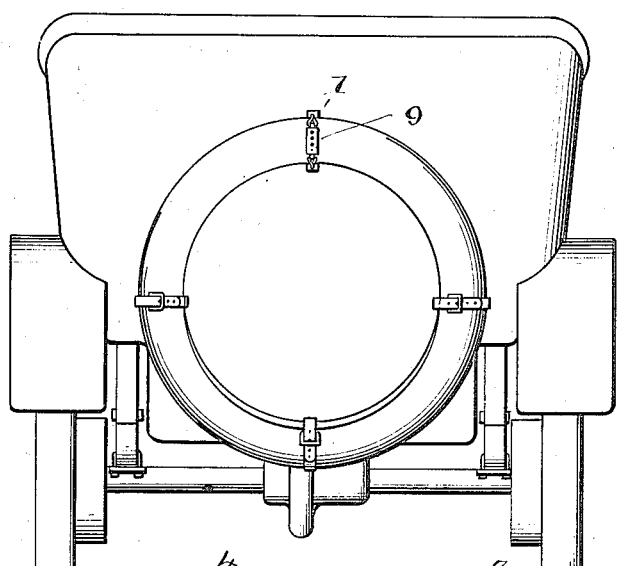
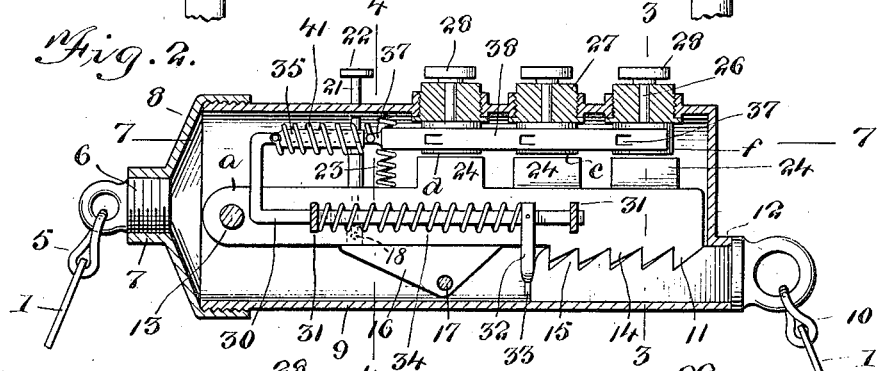
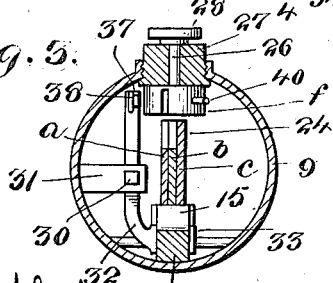
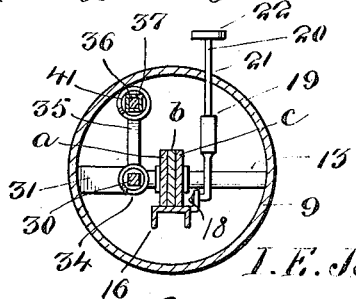
WITNESSES
INVENTOR
I. E. Jackson
BY Victor J. Evans
ATTORNEY I. E. JACKSON.
PERMUTATION TIRE LOCK.
APPLICATION FILED FEB. 7, 1917.
1,240,146.
Patented Sept. 11, 1917.
2 SHEETS—SHEET 2.
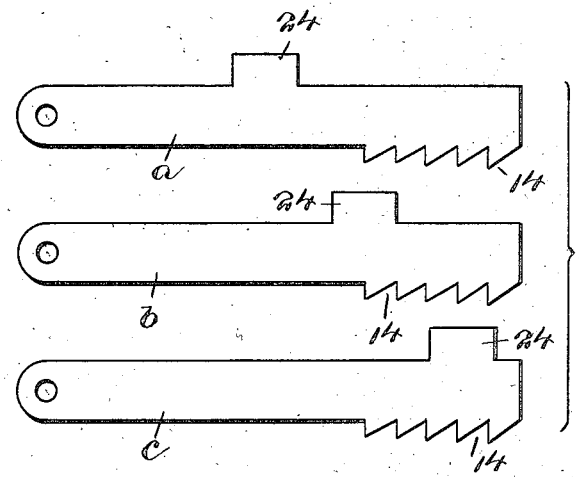
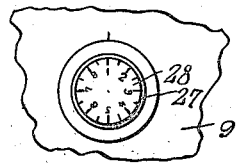
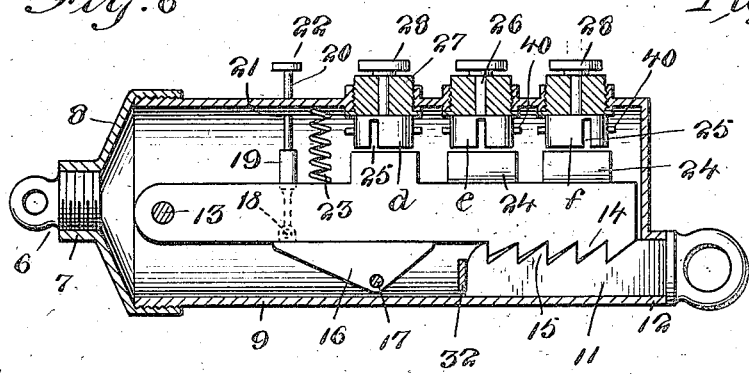
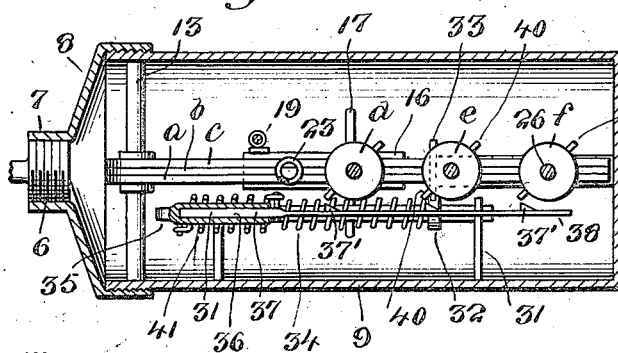
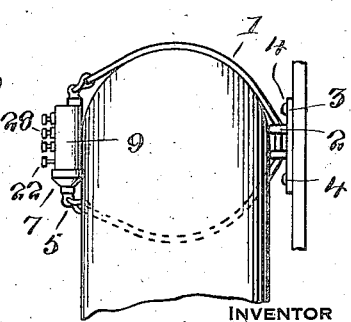
INVENTOR
I. E. Jackson
BY Victor J. Evans
ATTORNEY
WITNESSES

UNITED STATES PATENT OFFICE.

IRL E. JACKSON, OF CASA, ARKANSAS.

PERMUTATION TIRE-LOCK.

1,240,146.     Specification of Letters Patent.     Patented Sept. 11, 1917.

Application filed February 7, 1917. Serial No. 147,207.

*To all whom it may concern:*

Be it known that I, IRL E. JACKSON, a citizen of the United States, residing at Casa, in the county of Perry and State of Arkansas, have invented new and useful Improvements in Permutation Tire-Locks, of which the following is a specification.

This invention relates to permutation tire locks, the broad object in view being to provide reliable means for holding and locking one or more extra tires on an automobile or similar vehicle, the lock being adapted to be manipulated without the use of a key and being capable of operation on the part only of an authorized person who is acquainted with the combination necessary to successfully operate the lock for the purpose of releasing the tire.

With the above and other objects in view, the invention consists in the novel construction, combination and arrangement of parts, herein fully described, illustrated and claimed.

In the accompanying drawings:

Figure 1 is a rear elevation of an automobile showing the complete tire lock in its applied relation thereto.

Fig. 2 is a longitudinal section through the lock casing, showing a portion of the mechanism contained therein.

Fig. 3 is a cross section on the line 3—3 of Fig. 2.

Fig. 4 is a cross section on the line 4—4 of Fig. 2.

Fig. 5 is a detail view of the several locking dogs.

Fig. 6 is a longitudinal section through the lock taken on a different line from Fig. 2.

Fig. 7 is a section on the line 7—7 of Fig. 2.

Fig. 8 is a fragmentary elevation showing the relation of the device to a tire and motor vehicle body.

Fig. 9 is a fragmentary plan view showing one of the graduated tumbler heads.

Referring to the drawings 1 designates a flexible tire encircling band which is secured by means of keepers 2 to an anchoring or attaching plate 3 which is secured by suitable fastening means 4 to the body or frame of a motor vehicle as illustrated in Figs. 1 and 8.

Connected to one end of the band 1 by means of a link 5 or its equivalent, is a threaded plug 6 which is adapted to be screwed into the threaded end portion 7 of the cap 8 of the lock casing 9, the parts 8 and 9 being shown as threaded together so that they may be separated. The part 8 may also be separated from the plug 6 in order to detach the lock from the band 1. At its other end, the band 1 has connected thereto by a link 10 or the equivalent thereof a hasp 11 insertible through an opening 12 in the adjacent end of the lock casing 9.

The lock mechanism contained mainly within the casing 9, embodies a plurality of pivoted locking dogs $a$, $b$ and $c$, three of such dogs being shown. These dogs are shown as mounted on a common pivot pin 13 and provided adjacent to their free ends with saw shaped teeth 14 the purpose of which will appear. The teeth 14 of all of the dogs are in transverse alinement with each other so as to engage teeth 15 on the hasp 11. The dogs $a$, $b$ and $c$ are comparatively thin while the hasp 11 is comparatively thick or wide faced in order that the teeth 15 of the hasp may simultaneously engage the teeth 14 of all of the locking dogs when the hasp is thrust into the casing 9 beneath said locking dogs.

The means for shifting the locking dogs, comprises a dog shifter 16 which is mounted on a pivot 17 within the casing 9 and which has connected thereto by means of a pivot 18, an operating member made in two sections 19 and 20, the section 20 having a detachable engagement with the section 19, the member 20 passing through an opening 21 in the lock casing and being provided with a head 22. This separable construction of the shifter actuating member 19, 20, facilitates the removal of certain parts of the locking mechanism from the casing 9, when necessary. The dogs $a$, $b$ and $c$ are normally held in engagement with the hasp 11 by means of one or more depressing springs 23.

The means for preventing movement of the locking dogs and also permitting the same to be moved, will now be described. Each dog is provided with a projection or lip 24 which is adopted to enter a slot 25 in one of a series of rotatable tumblers $d$, $e$ and $f$. The slots 25 are arranged with special reference to the location of the projections or lips 24 in order that all of said projections or lips may be received at one operation in the slots 25 after the tumblers have been turned to the proper points. Each tumbler d, e and f has a stem or shank 26 which extends through a detachable bushing 27 externally threaded and screwed through an opening in the wall of the casing, the stem or shank 26 projecting beyond the bushing 27 and having fast thereon a graduated head 28 by means of which each tumbler may be rotated to bring the slot thereof into alinement with the lip or projections 24 of the respective locking dog. The graduations on each head 28 may consist of numbers, letters or other characters or symbols in accordance with the preference of the manufacturer.

In connection with the mechanism hereinabove described I provide tumbler tripping mechanism for displacing or destroying the combination, such mechanism being of an automatic character and being constructed and arranged as follows:

30 designates a plunger movable in a rectilinear path through fixed guides 31 within the casing. The plunger 30 has a laterally projecting arm 32 which carries a shoe 33 that follows the hasp 11 when the latter is withdrawn from the casing, such movement of the plunger and shoe being brought about by a spring 34 which is interposed between the arm 32 and a fixed point such as one of the guides 31 as shown in Fig. 2. The plunger also comprises another angle arm 35 bored to form a tubular socket 36 which receives the shank 37 of a flexible tumbler trip 38 which consists of a spring strip having trip lugs 37' projecting therefrom and formed with beveled surfaces which are adapted to engage pins or studs 40 on the rotatable tumblers d, e and f. A spring 41 is connected at one end to the angle arm 35 and at the other end to the tumbler trip 38, said spring allowing the plunger 30 to be pushed inwardly to the necessary extent by the hasp 11 as the latter is pushed into the casing, before the trip 38 is moved in a rectilinear path so as to enable the trip lugs 37' to act upon the studs 40 for the purpose of turning the rotatable tumblers and displacing the latter or partially rotating the same so as to move the slots 25 of the tumblers out of alinement with the projections 24 of the locking dogs.

From the foregoing description taken in connection with the accompanying drawings, the operation of the lock mechanism will now be understood. When the hasp 11 is in its locked position, the teeth 15 of the hasp are held by the teeth 14 of the several locking dogs. To unlock the hasp, the rotatable tumblers d, e and f are positioned by means of the graduated heads or dials 28 so that the slots 25 will be in alinement with the projections 24 of the locking dogs. Until this is done, the locking dogs cannot be moved on their pivots. After the tumblers are thus properly adjusted, the dog lifter 16 is rocked by means of the operating member 19, 20. The projections 24 are thus received in the slots 25 of the tumblers, the movement of the dogs being sufficient to disengage the teeth 14 thereof from the teeth 15 of the latch. The hasp is now withdrawn. To relock the hasp, the latter is reinserted into the casing thereby lifting the locking dogs and pushing inwardly against the shoe 33 which thereby moves the plunger 30 in a corresponding direction. In the outward movement of the hasp 11, the spring 34 has advanced the flexible tumbler trip 38 until the trip lugs 37' have passed by the studs 40 of the tumblers. When the hasp is reinserted and pushed against the shoe 33 and the plunger 30 is correspondingly shifted, the spring 41 allows the tumbler trip 38 to remain in its position until the hasp has reached its final position, whereupon the locking dogs a, b and c are pushed downwardly by the spring or springs 23, the projections 24 at the same time moving out of the slots 25 of the tumblers and leaving the lock free. Thereupon the spring 41 acts to retract the flexible tumbler trip 38, and the projections or lugs 39 thereupon coact with the studs 40 to give a partial rotation to the tumblers d, e and f. This disarranges the tumblers which then prevent movement of the locking dogs. The combination may be changed by interchanging the pivoted locking dogs and by correspondingly interchanging the tumblers which may be done by detaching the bushings 27 and inserting them in the desired threaded openings in the casing 9.

I claim:—

1. A lock of the class specified, comprising a lock casing, a hasp insertible in said casing and provided with teeth, a plurality of pivoted locking dogs in said casing having teeth to engage the teeth of the hasp, a manually controlled dog shifting member coöperating with said dogs to move the latter out of engagement with the hasp, and a plurality of rotatable tumblers operable from the exterior of the casing and formed with slots to receive and admit of the pivotal movement of said locking dogs, each of said dogs having a projection adapted to enter the slot in the respective tumbler.

2. A lock of the class specified, comprising a lock casing, a hasp insertible in said casing and provided with teeth, a plurality of pivoted locking dogs in said casing having teeth to engage the teeth of the hasp, also having tumbler engaging projections, a manually controlled dog shifting member coöperating with said dogs to move the latter out of engagement with the hasp, a plurality of rotatable tumblers operable from the exterior of the casing and formed with slots to receive the projections of the dogs and admit of the pivotal movement of said locking dogs, and means for yieldingly pressing said dogs into engagement with said hasp.

3. A lock of the class specified, comprising a lock casing, a hasp insertible in said casing and provided with teeth, a plurality of pivoted locking dogs in said casing having teeth to engage the teeth of the hasp, also having tumbler engaging projections, a manually controlled dog shifting member coöperating with said dogs to move the latter out of engagement with the hasp, a plurality of rotatable tumblers operable from the exterior of the casing and formed with slots to receive the projections of the dogs and admit of the pivotal movement of said locking dogs, and means operable exteriorly of the casing for actuating said dog shifting member.

4. A lock of the class specified, comprising a lock casing, a hasp insertible in said casing and provided with teeth, a plurality of pivoted locking dogs in said casing having teeth to engage the teeth of the hasp, also having tumbler engaging projections, a manually controlled dog shifting member coöperating with said dogs to move the latter out of engagement with the hasp, a plurality of rotatable tumblers operable from the exterior of the casing and formed with slots to receive the projections of the dogs and admit of the pivotal movement of said locking dogs, and means operable by said hasp as the latter is inserted in the casing coöperating with the tumblers for imparting a partial rotative movement thereto.

5. A lock of the class specified, comprising a lock casing, a hasp insertible in said casing and provided with teeth, a plurality of pivoted locking dogs in said casing having teeth to engage the teeth of the hasp, also having tumbler engaging projections, a manually controlled dog shifting member coöperating with said dogs to move the latter out of engagement with the hasp, a plurality of rotatable tumblers operable from the exterior of the casing and formed with slots to receive the projections of the dogs and admit of the pivotal movement of said locking dogs, and means operable by the hasp as the latter is inserted in the casing for shifting said tumblers, the last named means embodying studs on the tumblers, and a flexible tumbler trip having lugs which coöperate with the studs on the tumblers.

6. A lock of the class specified, comprising a lock casing, a hasp insertible in said casing and provided with teeth, a plurality of pivoted locking dogs in said casing having teeth to engage the teeth of the hasp, also having tumbler engaging projections, a manually controlled dog shifting member coöperating with said dogs to move the latter out of engagement with the hasp, a plurality of rotatable tumblers operable from the exterior of the casing and formed with slots to receive the projections of the dogs and admit of the pivotal movement of said locking dogs, means operable by said hasp as the latter is inserted in the casing for shifting said tumblers, the last named means embodying studs on the tumblers, a flexible tumbler trip having lugs which coöperate with the studs on the tumblers, and a hasp actuated plunger with which said tumbler trip has a yieldable connection.

In testimony whereof I affix my signature.

IRL E. JACKSON.